United States Patent
Weston

(10) Patent No.: US 7,219,991 B2
(45) Date of Patent: May 22, 2007

(54) AUXILIARY LENS ATTACHMENT FOR USE ON EYEGLASSES

(76) Inventor: Tom Weston, P.O. Box 391, Windham, ME (US) 04062

( * ) Notice: Subject to any disclaimer, the term of this patent is extended or adjusted under 35 U.S.C. 154(b) by 18 days.

(21) Appl. No.: 11/154,440

(22) Filed: Jun. 16, 2005

(65) Prior Publication Data
US 2006/0285070 A1 Dec. 21, 2006

(51) Int. Cl.
G02C 7/08 (2006.01)
(52) U.S. Cl. .......................................... 351/57; 351/47
(58) Field of Classification Search .................. 351/41, 351/47, 48, 57, 58, 110
See application file for complete search history.

(56) References Cited

U.S. PATENT DOCUMENTS

| | | |
|---|---|---|
| 2,230,577 A | 2/1941 | Sager |
| 2,300,364 A | 10/1942 | Wagner |
| 2,516,764 A | 7/1950 | Ehlert et al. |
| 2,580,859 A | 1/1952 | Steckler |
| 2,584,000 A | 1/1952 | Ehlert et al. |
| 2,602,372 A | 7/1952 | Passet |
| 2,953,968 A | 9/1960 | Hoffmaster |
| 2,976,767 A | 3/1961 | McNeill |
| 2,988,956 A | 6/1961 | Carmichael |
| 3,059,531 A | 10/1962 | Maxson |
| 3,147,488 A | 9/1964 | Maxson |
| 3,413,057 A | 11/1968 | Carmichael |
| 3,414,350 A | 12/1968 | McNeill |
| 3,531,188 A | 9/1970 | Leblanc et al. |
| 3,575,497 A | 4/1971 | Leblanc |
| 3,741,634 A | 6/1973 | Stoltze |
| 3,876,295 A | 4/1975 | Loughner |
| 4,163,607 A | 8/1979 | Nannini |
| 4,247,178 A | 1/1981 | Cook |
| 4,810,081 A | 3/1989 | Mapelli et al. |
| 4,886,340 A | 12/1989 | Kanda |
| 4,890,910 A | 1/1990 | Gazeley |
| 5,017,001 A | 5/1991 | Kooketsu |
| 5,100,224 A | 3/1992 | Terrasi |
| 5,123,724 A | 6/1992 | Salk |
| 5,164,749 A | 11/1992 | Shelton |
| D336,308 S | 6/1993 | Shelton |
| D350,359 S | 9/1994 | Friedman |
| 5,546,140 A | 8/1996 | Underwood |
| 5,710,614 A | 1/1998 | Cereda |
| 5,953,096 A | 9/1999 | Friedman |
| 6,224,207 B1 | 5/2001 | Shelton |
| 6,254,232 B1 | 7/2001 | Friedman |
| 6,302,538 B1 | 10/2001 | Friedman |
| 6,450,638 B1 * | 9/2002 | De Lima ...................... 351/57 |
| 6,485,143 B2 | 11/2002 | Buettgenbach |
| 6,557,996 B2 | 5/2003 | Lavic |
| 6,659,605 B2 | 12/2003 | Shono |
| 6,702,439 B1 | 3/2004 | Lee |

(Continued)

Primary Examiner—Huy Mai
(74) Attorney, Agent, or Firm—Spencer Fane Britt & Browne LLP

(57) ABSTRACT

An aesthetically pleasing attachment for removeably mounting auxiliary lenses on standard styles of eyeglasses configurations eyeglasses, and that will securely retain the auxiliary lenses in desired position without obstructing or distorting the view of the wearer or damaging the lenses of the eyeglasses, includes a pair of auxiliary lenses attached to a bridge member, and at least one gripper member associated with each auxiliary lens adapted to engage a rear upper surface of the eyeglasses frame or lenses, at or near the connecting bridge of the eyeglasses frame.

13 Claims, 5 Drawing Sheets

U.S. PATENT DOCUMENTS

| | | |
|---|---|---|
| 6,702,440 B1 | 3/2004 | Park |
| 6,755,521 B1 | 6/2004 | Begg |
| 6,773,105 B2 | 8/2004 | Friedman |
| 6,799,846 B1 | 10/2004 | Chow |
| 6,896,367 B1 * | 5/2005 | Sohn .......................... 351/110 |
| 2004/0075805 A1 * | 4/2004 | Friedman ..................... 351/47 |
| 2006/0119786 A1 * | 6/2006 | Munakata et al. ............ 351/47 |
| 2006/0158604 A1 * | 7/2006 | Kwan .......................... 351/47 |

* cited by examiner

AUXILIARY LENS ATTACHMENT FOR USE ON EYEGLASSES

BACKGROUND OF THE INVENTION

This invention relates to an auxiliary lens attachment for releasable attachment of auxiliary lenses such as sun shades to prescription eyeglasses.

Conventional mounting mechanisms for releasably attaching auxiliary lenses to eyeglasses either attach to the bridge of the eyeglasses, the lens frame of the eyeglasses, or the lenses of the eyeglasses. Mounting arrangements for releasably attaching auxiliary lenses to eyeglasses typically add significant structural features to the auxiliary lenses which are often unattractive. Furthermore, they may partially obstruct the view of the wearer. Some mounting mechanisms attach the auxiliary lenses to eyeglasses in a manner that results in gaps between the auxiliary lenses and the eyeglasses lenses which may distract or distort the view of the wearer.

One type of mounting mechanism utilizes a clamp assembly attached to the bridge structure connecting the auxiliary lenses. The clamp assembly includes pairs of opposing clip members which are spring loaded toward each other so as to frictionally retain therebetween the bridge and/or the lenses of the eyeglasses to which the auxiliary lenses are to be attached. While these clamp mechanisms have the advantage of potentially being able to fit a variety of different eyeglasses styles, the attachment may be insecure in some cases while in others the clamp mechanism parts may tightly engage the lenses of the eyeglasses, potentially scratching the lenses.

Another type of auxiliary lens mounting mechanism for use with eyeglasses includes a frame with means for holding a pair of auxiliary lenses with greater curvature in the horizontal plane than the curvature of the lenses of the eyeglasses. The frame includes a generally U-shaped attachment member with resilient prongs configured to extend over the lens frames of the eyeglasses and releasably engage cooperative grooves on the rear face of the eyeglasses frame to effect a snap-fit connection with the eyeglasses frame and urge the auxiliary lenses against the upper outer edges of the eyeglasses frame. Such mounting mechanism provides a simple, secure attachment, but has the disadvantage that it must be custom made to fit a particular size and style of eyeglasses frame which is specifically designed to accept the mounting mechanism.

Another peripheral type mounting mechanism designed to engage the eyeglasses lens frame members includes a number of resilient prongs fixed along a frame of the auxiliary lenses in a manner that the prongs snap onto the frame members of the eyeglasses. This type of mounting mechanism has the disadvantage that it must exactly fit the size and shape of the eyeglasses frame, requiring it to be custom made to fit a particular size and style of eyeglasses.

Accordingly, it is desirable to provide an auxiliary lens attachment that is capable of releasable connection to a variety of standard eyeglasses styles and sizes, is aesthetically pleasing in appearance, and that will securely retain the auxiliary lenses in desired position without obstructing or distorting the view of the wearer or damaging the lenses of the eyeglasses.

BRIEF SUMMARY OF THE INVENTION

There is, therefore, provided in the practice of the invention an attachment for removeably mounting auxiliary lenses on eyeglasses which is adapted to fit practically all styles of eyeglasses configurations, is aesthetically pleasing in appearance, and that will securely retain the auxiliary lenses in desired position without obstructing or distorting the view of the wearer or damaging the lenses of the eyeglasses. While the invention is substantially directed to shades for sunglasses, it has further applicability to other types of lenses, such as those for reading.

In accordance with an embodiment of the present invention, an auxiliary lens attachment for use on eyeglasses comprises a pair of auxiliary lenses attached to a bridge member, and a gripper member associated with each auxiliary lens, the gripper member being adapted to engage a rear surface of the eyeglasses frame or lenses, at or near the connecting bridge of the eyeglasses frame, in a manner that allows use on most configurations of eyeglasses, yet avoids obstructing or distorting the view of the wearer. Each gripper member is pivotally attached to the bridge member of the invention in a manner allowing for independent movement of each gripper member in a horizontal direction, or obliquely transverse to a horizontal direction, relative to the eyeglasses. The gripper members further include grasping elements designed to allow a user's thumb and fingers to pivotally move the gripper members for attachment to, or removal from, the eyeglasses. The gripper members are further adapted to provide a biasing force to urge a free end of the gripper member against a rear surface of the eyeglasses, said biasing force being effected through a spring member disposed between the gripper member and the bridge member.

In one embodiment of the invention spring members are disposed between each gripper member and the bridge member, where the spring provides a biasing force to urge the gripper member against a rear surface of the eyeglasses, and causes the gripper member to return to a pre-set position after pivotal movement of the gripper members.

In an embodiment of the invention where the gripper member engages the rear surface of the eyeglasses lens, the engaging surface of the gripper member is adapted for scratch resistant engagement with the lens of the eyeglasses. One embodiment includes a soft, pliable pad or coating attached to the end of the gripper member for scratch resistant engagement with the eyeglasses lenses.

The auxiliary lens attachment of the invention further includes a lens mounting member attached to the bridge member for holding the auxiliary lenses, and in which the auxiliary lens is removably mounted on the bridge member.

In an embodiment of the invention, the radius of curvature of the auxiliary lenses in the vertical plane is smaller than the radius of curvature of the eyeglasses such that the gripper members urge the lower perimeter of the auxiliary lenses against the lower portion of the eyeglasses frame, and the bridge member connecting the auxiliary lenses is capable of being manipulated in a manner that cooperates with the curvature of the auxiliary lenses in the horizontal plane such that the gripper members urge the horizontal outer ends of the auxiliary lenses against outer ends of the eyeglasses frame.

Accordingly, it is an object of the present invention to provide an improved auxiliary lens attachment for use on eyeglasses. There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. Though some features of the invention may be claimed in dependency, each feature has merit when used independently.

BRIEF DESCRIPTION OF THE DRAWINGS

Further features of the present invention will become apparent to those skilled in the art to which the present invention relates from reading the following description with reference to the accompanying drawings, in which.

DETAILED DESCRIPTION OF THE INVENTION

Figure 1:
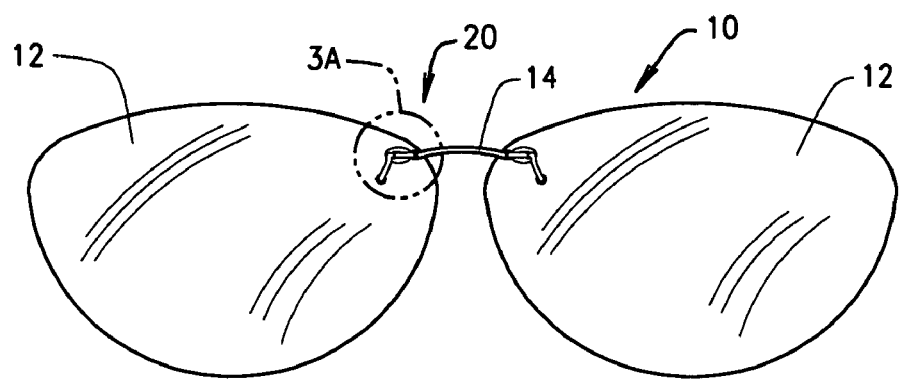
FIG. 1 is a rear perspective view illustrating an auxiliary lens attachment for eyeglasses according to a preferred embodiment of the invention.

The invention will now be described with reference to the drawing figures, in which like reference numerals refer to like parts throughout. For purposes of clarity in illustrating the characteristics of the present invention, proportional relationships of the elements have not been maintained in the Figures. Instead, the sizes of certain small components have been exaggerated for illustration.

An embodiment in accordance with the present invention provides an attachment for removeably mounting auxiliary lenses on eyeglasses which is adapted to fit practically all styles of eyeglasses configurations, is aesthetically pleasing in appearance, and that will securely retain the auxiliary lenses in desired position without obstructing or distorting the view of the wearer or damaging the lenses of the eyeglasses.

Figure 2:
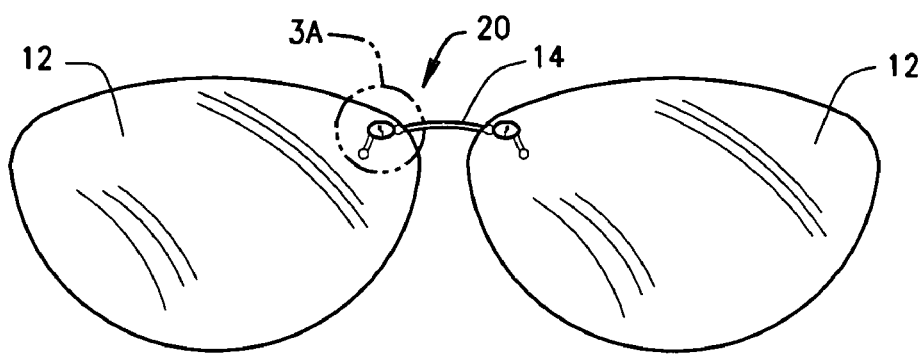
FIG. 2 is a front perspective view illustrating an auxiliary lens attachment for eyeglasses according to a preferred embodiment of the invention.

In accordance with an embodiment of the present invention, as shown in FIG. 1 and FIG. 2, an auxiliary lens attachment 10 for use on eyeglasses comprises a pair of auxiliary lenses 12 attached to a bridge member 14, and a gripper assembly 20 associated with each auxiliary lens, the gripper assembly 20 being adapted to engage a rear surface of the eyeglasses frame or lenses, at or near the connecting bridge of the eyeglasses frame, in a manner that allows use on most configurations of eyeglasses, yet avoids obstructing or distorting the view of the wearer. The auxiliary lenses may comprise shades for adapting the eyeglasses for use as sunglasses, or may comprise supplemental refractive lenses to assist for near or far viewing.

Figure 3A:
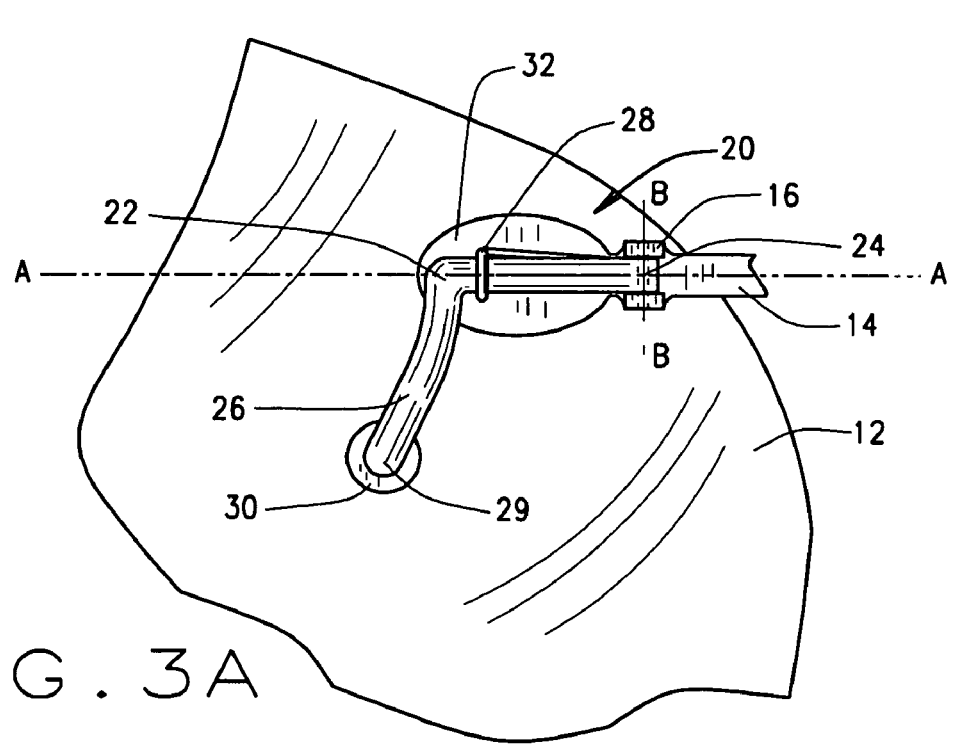
FIG. 3A is an enlarged partial view of the auxiliary lens attachment of FIG. 1, showing one end of the bridge member, one gripper member, and pivot member with a vertical hinge axis.
Figure 4:
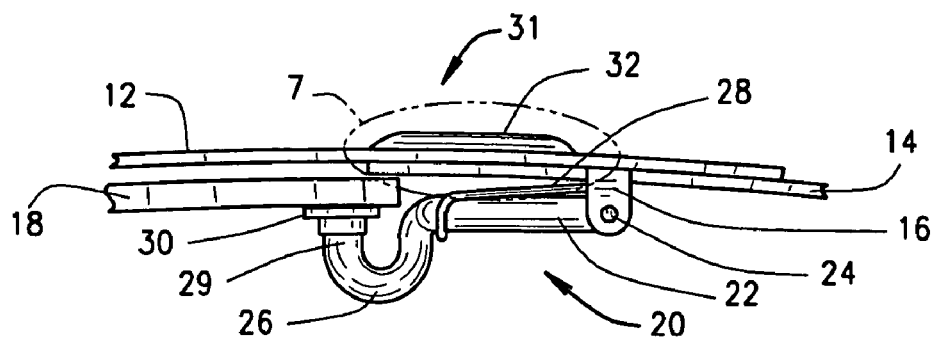
FIG. 4 is a partial top plan view of an embodiment of the bridge member and one gripper member showing a spring member disposed between the bridge member and the gripper member.
Figure 10A:
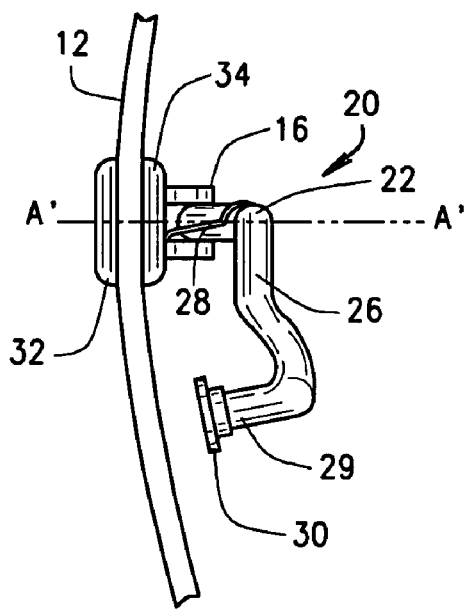
FIG. 10A is a side elevational view taken from the side of the auxiliary lens attachment of FIG. 3A.

As shown in FIG. 4, each gripper assembly 20 includes a gripper member 22 which is adapted for engagement with a lens 18 of a pair of eyeglasses. Gripper member 22 is adapted for pivotal attachment to the bridge member 14 at pivot member 16 with pivot pin 24 in a manner allowing for independent pivotal movement of each gripper member 22 relative to the eyeglasses. FIG. 3A shows pivot member 16 mounted in such a manner that it has a pivotable axis as shown by line B—B lying in a vertical orientation relative to line A—A. As can be seen in FIG. 10A, this arrangement permits pivotal movement of gripper member 22 in a horizontal direction relative to bridge member 14 and line A'—A' of the eyeglasses.

Figure 3B:
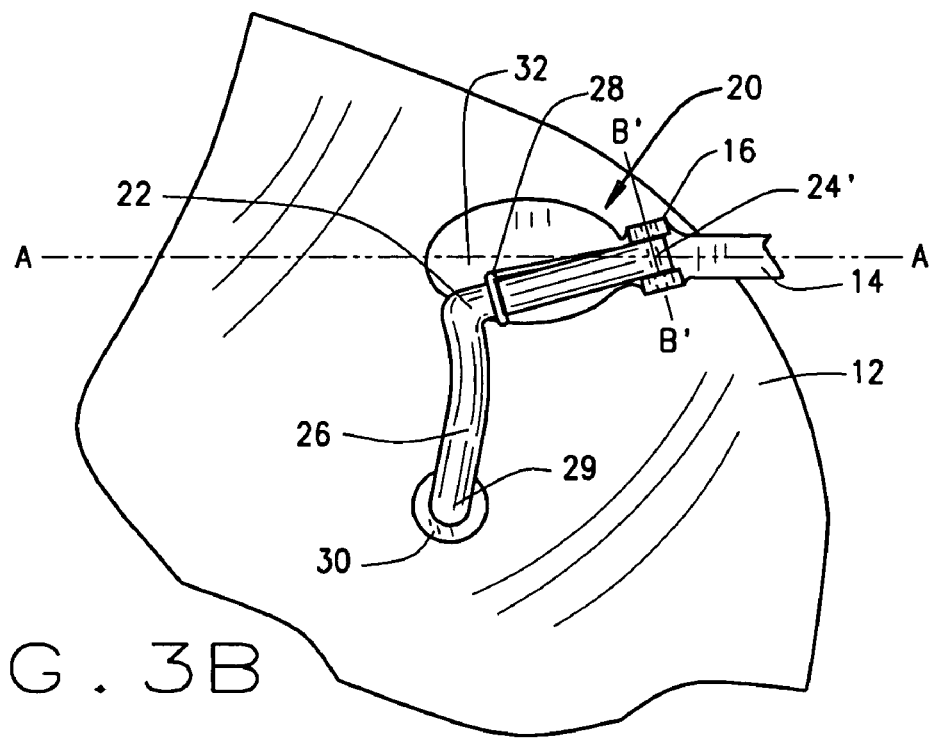
FIG. 3B is an enlarged partial view of the auxiliary lens attachment of FIG. 1, showing one end of the bridge member, one gripper member, and pivot member with a hinge axis offset from vertical.
Figure 3C:
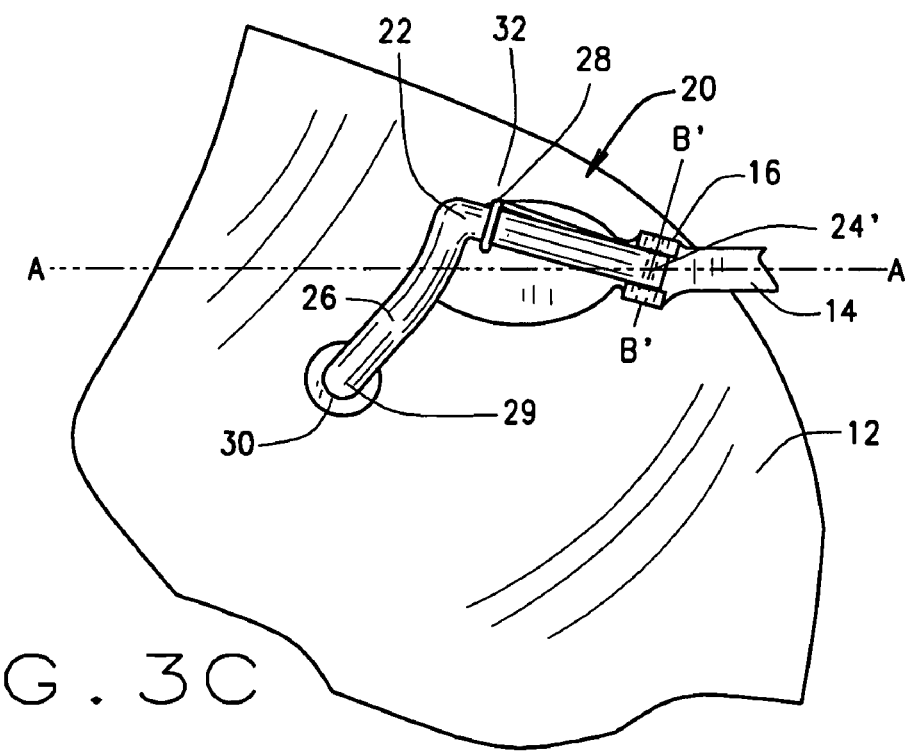
FIG. 3C is an enlarged partial view of another embodiment of the auxiliary lens attachment of FIG. 1, showing one end of the bridge member, one gripper member, and pivot member with a hinge axis offset from vertical.
Figure 10B:
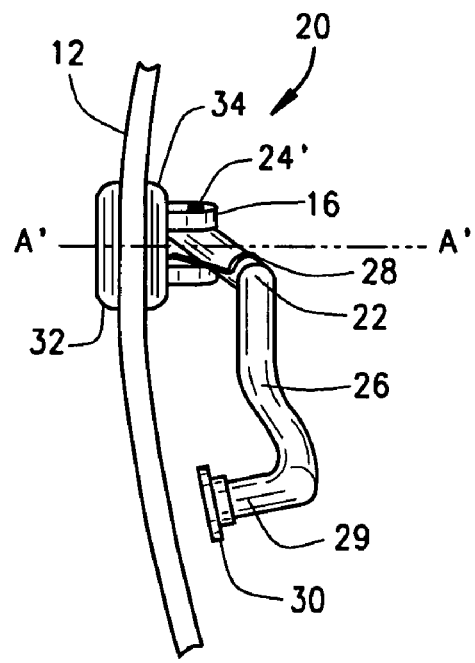
FIG. 10B is a side elevational view taken from the side of the auxiliary lens attachment of FIG. 3B.
Figure 10C:
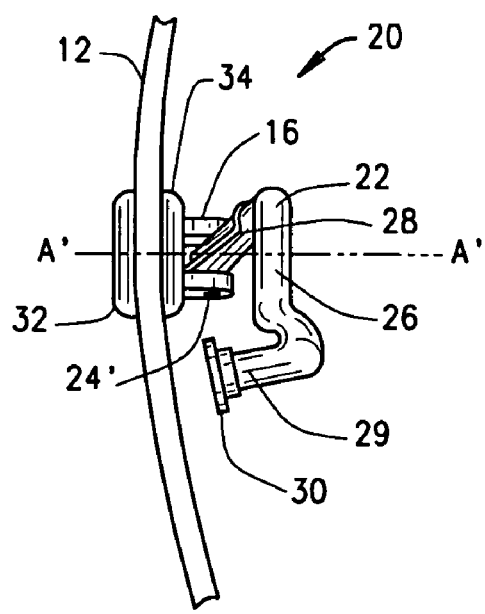
FIG. 10C is a side elevational view taken from the side of the auxiliary lens attachment of FIG. 3C.

Alternative embodiments are shown in FIGS. 3B and 3C, where each gripper member 22 is adapted for pivotal attachment to the bridge member 14 at pivot member 16 with pivot pin 24' wherein the hinge axis is offset, as shown by line B'—B', at an oblique angle of up to about 45 degrees from vertical relative to line A—A, allowing for independent pivotal movement of each gripper member 22 in a direction obliquely transverse to the horizontal direction relative to bridge member 14 and line A'—A' of the eyeglasses, as shown in FIGS. 10B and 10C. Each of the forementioned Figures show the lens attachment from a one-sided perspective with respect to the eyeglasses. It should be understood that the orientations shown would be reversed with respect to the other side of the eyeglasses.

Figure 5:
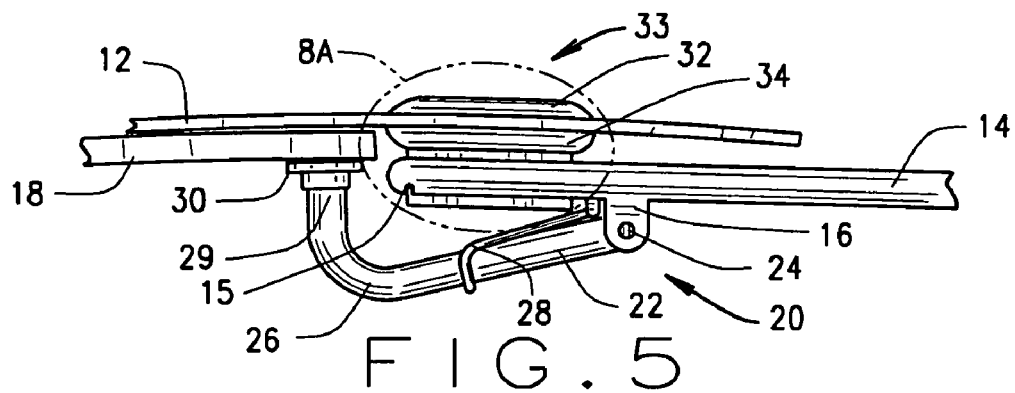
FIG. 5 is a partial top plan view of an embodiment of an auxiliary lens attachment of the invention, showing a removable lens attachment assembly connected to one end of the bridge member.
Figure 6:
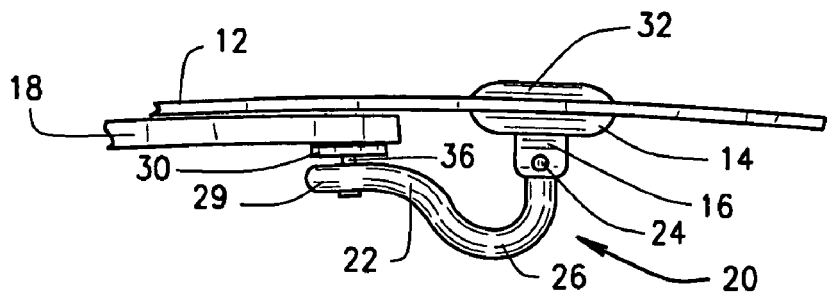
FIG. 6 is a top plan view of an auxiliary lens attachment according to an embodiment of the invention mounted on eyeglasses, showing the gripper member grasping elements.

As shown in FIGS. 4–6, the gripper members 22 further include grasping elements 26 designed to allow a user's thumb and fingers to pivotally move the gripper members 22 for attachment to, or removal from, the eyeglasses. An arcuate bend 26 in the gripper member 22 provides an engaging surface against which a user may exert pressure. In alternative embodiments of the invention, the shape of the grasping elements 26 is not limited to the configurations shown in FIG. 4, FIG. 5, and FIG. 6; therefore, within the scope of the invention, the grasping elements 26 may define any shape suitable for a user's thumb and fingers to pivotally move the gripper members 22.

As shown in FIG. 3A, FIG. 3B, FIG. 3C, FIG. 4, and FIG. 5, the gripper members 22 are further adapted to provide a biasing force to urge an end 29 of the gripper member 22 against a rear surface of the eyeglasses 18. Spring member 28 is disposed between the gripper member 22 and the bridge member 14 and provides a biasing force to urge end 29 of the gripper member 22 against a rear surface of the eyeglasses 18. Spring member 28 is resilient and permits pivotal movement of the gripper member 22 away from the lens. Due to the independent pivotal attachment of each gripper member 22 to bridge member 14, the auxiliary lens attachment of the instant invention maybe used on glasses where each of the lens pair is of a different thickness. The resiliency of spring member 28 permits gripper 22 to be held in biased engagement against any thickness of lens.

In an embodiment of the invention where end 29 of the gripper member 22 engages the rear surface of the eyeglasses lens 18, end 29 of the gripper member 22 is further adapted for scratch resistant engagement with the lens of the eyeglasses 18. One embodiment includes a soft, pliable pad or coating 30 attached to end 29 of the gripper member 22 for scratch resistant engagement with the eyeglasses lenses 18. In another embodiment, as shown in FIG. 6, the pad 30 is pivotally attached to the gripper member 22 at pivot 36.

Figure 7:
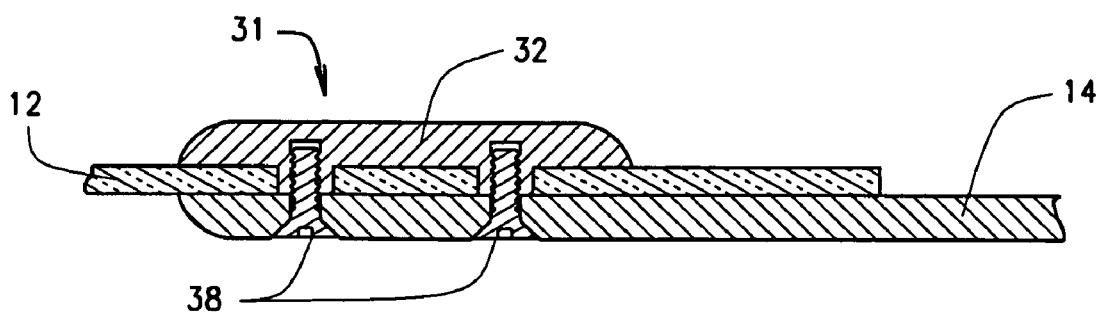
FIG. 7 is a partial cross-sectional, top plan view of an embodiment of the lens attachment member shown in FIG. 4.

As shown in FIG. 4 and FIG. 7, the auxiliary lens attachment 10 of the invention may include a lens mounting assembly 31 attached to each end of the bridge member 14 for independently mounting each of the auxiliary lenses 12. Lens mounting assembly 31 comprises a lens mounting member 32 attached to the front surface of auxiliary lens 12 for attaching the auxiliary lenses 12 to bridge member 14 with any of a variety of fastening elements known to one skilled in the art. Although an example of the auxiliary lens attachment 10 of the invention is shown in FIG. 7 using screws 38 to attach lens mounting member 32 and auxiliary lens 12 to the bridge member 14, it will be appreciated that other fastening elements or methods can be used; for example, adhesive, rivets, or any other fastening elements known to one skilled in the art.

Figure 8A:
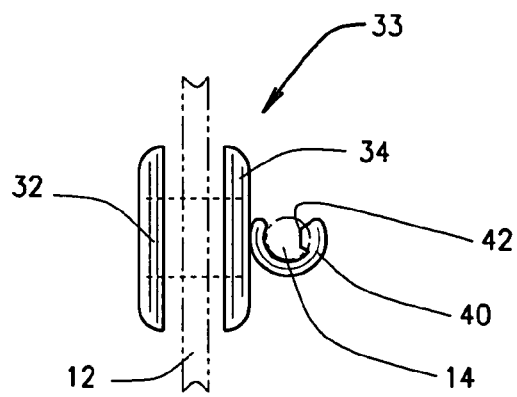
FIG. 8A is an exploded view in side elevation of an embodiment of the removable lens attachment assembly shown in FIG. 5.

In another embodiment as shown in FIG. 5 and FIG. 8A, the auxiliary lens attachment 10 of the invention further includes a lens mounting assembly 33, comprising a front lens mounting member 32 and a rear lens mounting member 34 for retaining auxiliary lens 12 therebetween with any of a variety of fastening elements known to one skilled in the art. The rear lens mounting member 34 further comprises a channel element 40 for receiving bridge member 14, and a latch element 42 that cooperates with groove 15 on bridge member 14, for removably mounting the auxiliary lens 12 on the bridge member 14. The lens mounting assembly 33 is adapted for secure attachment to bridge member 14 while allowing the user to quickly and easily remove the lens mounting assembly 33 by hand for replacement with alternative auxiliary lenses similarly configured.

Figure 8B:
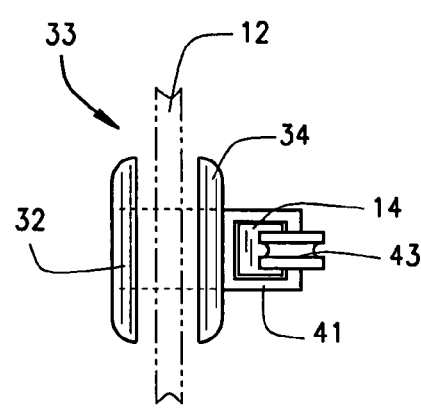
FIG. 8B is an exploded view in side elevation of an alternate embodiment of the removable lens attachment assembly shown in FIG. 5.

In an alternative embodiment as shown in FIG. 8B, the rear lens mounting member 34 further comprises a conduit element 41 for receiving bridge member 14, and a resilient latch element 43 that cooperates with groove 15 on bridge member 14, for removably mounting the auxiliary lens 12 on the bridge member 14.

Figure 9A:
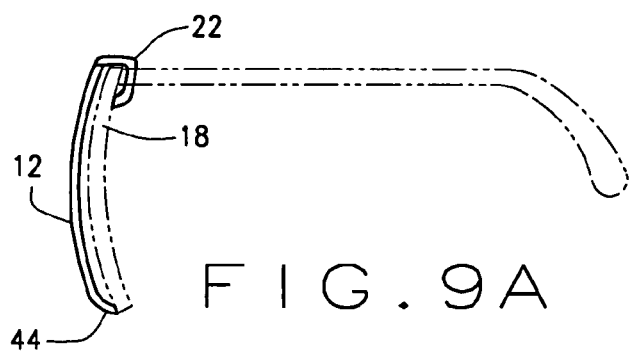
FIG. 9A is side elevation view of an embodiment of the auxiliary lens attachment of the invention, showing the auxiliary lens attachment attached to a pair of eyeglasses.
Figure 9B:
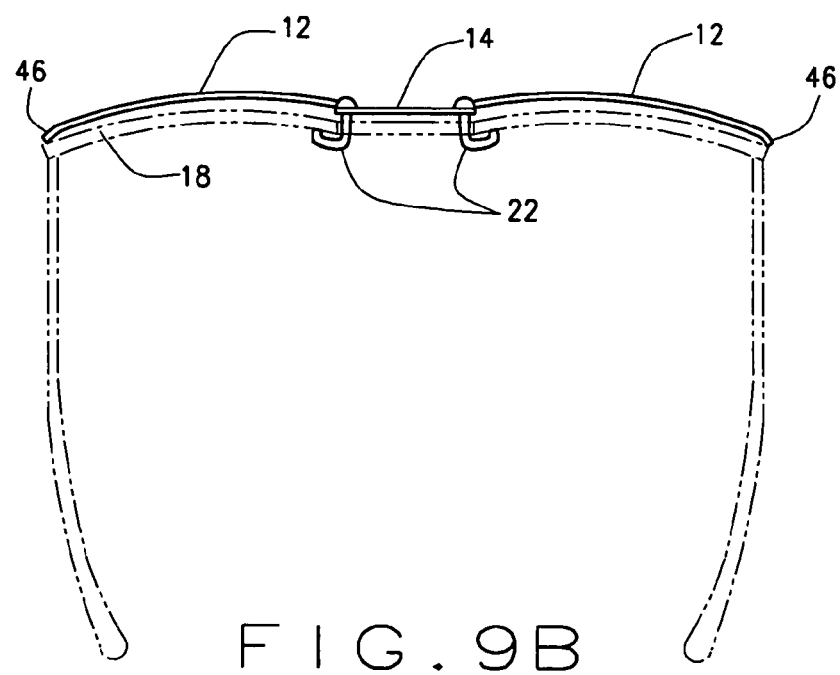
FIG. 9B is top plan view of an embodiment of the auxiliary lens attachment of the invention, showing the auxiliary lens attachment attached to a pair of eyeglasses.

In an embodiment of the invention shown in FIG. 9A and FIG. 9B, the radius of curvature of the auxiliary lenses 12 is smaller than the radius of curvature of the eyeglasses 18 such that the radius of curvature of the auxiliary lenses 12 cooperates with gripper members 22 to urge the lower perimeter 44, and the horizontal outer ends 46 of auxiliary lenses 12 against the frame of the eyeglasses 18. In another embodiment of the invention, the bridge member 14 connecting auxiliary lenses 12 is capable of being manipulated in a manner that cooperates with the curvature of auxiliary lenses 12 in the horizontal plane to insure that the horizontal outer ends 46 of auxiliary lenses 12 bias against the outer ends of the eyeglasses frame 18 in all cases. In this manner the auxiliary lens attachment 10 of the invention is adapted to provide a secure gap-free fit to the eyeglasses 18, and to avoid contact between the auxiliary lenses 12 and the lenses of the eyeglasses 18 irrespective of the degree of curvature of the eyeglasses 18.

From the above description of preferred embodiments of the invention, those skilled in the art will perceive improvements, changes and modifications. Such improvements, changes and modifications within the skill of the art are intended to be covered by the appended claims.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An auxiliary lens attachment for mounting on eyeglasses, said auxiliary lens attachment comprising:
   (a) a pair of auxiliary lenses;
   (b) a bridge member connecting the auxiliary lenses;
   (c) at least one gripper member associated with each auxiliary lens, each gripper member being pivotally attached to the bridge member for pivotal movement of the gripper member into and out of contact with the eyeglasses, a pivot member being disposed between said gripper member and said bridge member, said pivot member having an axis about which relative rotational movement of said gripper member with respect to said bridge member occurs, said auxiliary lenses being adapted to be positioned adjacent a front surface of lenses of said eyeglasses, said gripper members being adapted to engage a non-edge rear surface of a lens portion of said eyeglasses such that said eyeglasses are biasedly engaged between said auxiliary lens and said gripper members.

2. The auxiliary lens attachment of claim 1 in which each gripper member is pivotally attached to the bridge member for pivotal movement in a horizontal direction relative to the eyeglasses.

3. The auxiliary lens attachment of claim 2, wherein each gripper member is adapted for pivotal movement independently of each other gripper member, said gripper members comprise grasping elements, said grasping elements being adapted to be engaged by a user's thumb and fingers to effect pivotal movement of said gripper members, and said gripper members are adapted to provide a biasing force to urge the gripper members against a rear surface of the eyeglasses and said biasing force is effected though a spring member disposed between the gripper member and the bridge member.

4. The auxiliary lens attachment of claim 1 in which each gripper member is pivotally attached to the bridge member for pivotal movement in a direction obliquely transverse to the horizontal direction relative to the eyeglasses.

5. The auxiliary lens attachment of claim 4, wherein each gripper member is adapted for pivotal movement independently of each other gripper member, said gripper members comprise grasping elements, said grasping elements being adapted to be engaged by a user's thumb and fingers to effect pivotal movement of said gripper members, and said gripper members are adapted to provide a biasing force to urge the gripper members against a rear surface of the eyeglasses and said biasing force is effected through a spring member disposed between the gripper member and the bridge member.

6. The auxiliary lens attachment of claim 1 in which each gripper member is adapted for pivotal movement independently of each other gripper member while mounted on the eyeglasses.

7. The auxiliary lens attachment of claim 1 in which said gripper members comprise grasping elements, said grasping elements being adapted to be engaged by a user's thumb and fingers to effect pivotal movement of said gripper members.

8. The auxiliary lens attachment of claim 1 in which the gripper member is adapted to provide a biasing force to urge the gripper member against the rear surface of said lens portion of said eyeglasses.

9. The auxiliary lens attachment of claim 8 in which said biasing force is effected through a spring member disposed between the gripper member and the bridge member.

10. The auxiliary lens attachment of claim 1 further including a non-scratch pad attached to an end of the gripper member for scratch resistant engagement with the lens of the eyeglasses.

11. The auxiliary lens attachment of claim 10 in which the non-scratch pad is pivotally attached to the end of the gripper member.

12. The auxiliary lens attachment of claim 1, further including a lens mounting assembly attached to each end of the bridge member for independently holding each of the auxiliary lenses.

13. The auxiliary lens attachment of claim 12 in which the lens mounting assembly is removably retained on the bridge member.

* * * * *